(12) United States Patent
Brady

(10) Patent No.: US 6,322,111 B1
(45) Date of Patent: Nov. 27, 2001

(54) SELF-SEALING COUPLING CONNECTOR FOR AIR DUCTS

(75) Inventor: Larry V. Brady, Fort Worth, TX (US)

(73) Assignee: Lewis & Lambert, L.L.L.P., Haltom City, TX (US)

( * ) Notice: Subject to any disclaimer, the term of this patent is extended or adjusted under 35 U.S.C. 154(b) by 0 days.

(21) Appl. No.: 09/488,691

(22) Filed: Jan. 20, 2000

Related U.S. Application Data

(60) Provisional application No. 60/116,912, filed on Jan. 22, 1999.

(51) Int. Cl.[7] .................................................. F16L 17/00
(52) U.S. Cl. ........................ 285/370; 285/110; 285/331; 285/910; 277/647; 277/648; 277/650
(58) Field of Search ..................................... 285/110, 370, 285/331, 910; 277/647, 648, 650

(56) References Cited

U.S. PATENT DOCUMENTS

| | | |
|---|---|---|
| 2,338,316 | 9/1944 | Buzzell . |
| 3,001,805 | 9/1961 | Jones et al. . |
| 3,163,448 | 12/1964 | Franklin . |
| 3,269,754 | 8/1966 | Bertling et al. . |
| 3,400,954 * | 9/1968 | Brown .................................. 285/110 |
| 3,516,693 | 6/1970 | Glover . |
| 3,955,834 | 5/1976 | Ahirot . |
| 4,050,703 | 9/1977 | Tuvesson et al. . |
| 4,363,505 | 12/1982 | Smith . |
| 4,819,972 * | 4/1989 | Champa et al. ...................... 285/331 |
| 5,213,374 | 5/1993 | Keating . |
| 5,316,352 | 5/1994 | Smith . |
| 5,531,460 | 7/1996 | Stefansson et al. . |
| 5,709,411 * | 1/1998 | Bank et al. ........................... 285/110 |
| 5,730,474 * | 3/1998 | Bank .................................... 285/110 |

FOREIGN PATENT DOCUMENTS

| | | |
|---|---|---|
| 1534902 | 8/1968 | (FR) . |
| 358490 | 8/1938 | (IT) . |

OTHER PUBLICATIONS

*Lindab Ventilation* brochure, 8 pages, Lindab Ventilation AB, Bastad, Sweden.

* cited by examiner

*Primary Examiner*—B. Dayoan
*Assistant Examiner*—Carlos Lugo
(74) *Attorney, Agent, or Firm*—Geoffrey A. Mantooth

(57) ABSTRACT

An air duct installation joins the ends of two air ducts together using a self-seal coupling connector. The coupling connector has a band with first and second edges and inside and outside surfaces. First and second gaskets are provided, with each gasket being wrapped around a respective edge of the band. Each gasket has a first portion that is interposed between the band and the respective air duct. The first portion of each gasket has seals or lips that extend into contact with the respective air duct. In addition, the first portion of each gasket has a bead that serves as a mechanical stop. The air duct is installed by sliding onto the gasket, wherein the end of the air duct contacts the bead. In addition, the first portion of each gasket is inclined between the lips and the bead. This inclination results in an increasing gasket thickness toward the bead, wherein another seal is provided and the joint is snugged. Each gasket wraps around the respective edge of the band with a connecting portion and a second portion.

3 Claims, 5 Drawing Sheets

SELF-SEALING COUPLING CONNECTOR FOR AIR DUCTS

RELATED APPLICATIONS

This application claims the benefit of U.S. Provisional Application Serial No. 60/116,912, filed Jan. 22, 1999.

FIELD OF THE INVENTION

The present invention relates to couplings and/or connectors for air ducts.

BACKGROUND OF THE INVENTION

Heating, Ventilation and Air Conditioning (HVAC) systems utilize air ducts to distribute and transport air from one location to another. HVAC systems are used in residential, commercial and industrial applications. The vast majority of HVAC systems are used inside of buildings; some however are used for outside applications.

In a typical installation, ducts extend from a plenum to registers which are located in one or more rooms. The ducts can be of various lengths and diameters, and typically include turns or radiuses.

One type of air duct is made from galvanized sheet metal. The air ducts are in essence pipes. When two segments of air ducts are coupled together, a joint is formed.

It is desirable to seal the joint in order to prevent air leakage. Leaking joints reduce the overall efficiency of the HVAC system.

In the prior art, there are several ways to seal a joint coupling air ducts. By far, the least preferred is the use of duct tape. The adhesive on the tape degrades over time and with high temperatures, resulting in a loss of seal.

Duct mastic is a compound that is applied to a joint. When the mastic dries, it provides a satisfactory seal. Unfortunately, the application of duct mastic around the entire circumference of the joint is difficult to accomplish, especially when the duct is located adjacent to a ceiling, where access is difficult. Thus, the cost for sealing joints with mastic can be high due to the amount of labor involved. Furthermore, some duct mastic gives off fumes which contribute to poor air quality and even to sick building syndrome.

Still another prior seal is provided by Lindab, and is described in U.S. Pat. Nos. 4,050,703 and 5,531,460. A circumferential rubber seal is coupled to each end of air duct pipes. The two ends are joined together by a collar, which contacts the seal in each pipe. This type of seal works well. However, it is expensive to make. In addition, the seal is relatively fragile. Once the collar is placed over the seal, removing the collar may cause the seal to rip.

SUMMARY OF THE INVENTION

It is an object of the present invention to provide an apparatus for sealing a joint between two air ducts.

It is another object of the present invention to provide an apparatus for sealing a joint between air ducts, which apparatus is inexpensive to make and easy to install.

The present invention provides a coupling connector for joining and sealing air ducts. The coupling connector has a band with first and second edges. The band has inside and outside surfaces. The inside and outside surfaces extend between the first and second edges. There is gasket material having one portion in contact with either the inside surface or the outside surface of the band. The one portion has a stop bead and seals that extend radially away from the band. The stop bead is between the seals. The gasket material has another portion that wraps around the first and second edges of the band.

The coupling connector allows two ends of an air duct to be quickly and simply joined together in an airtight fashion. In addition, because the coupling connector utilizes a band and gaskets around the band, no special sheet metal tooling is required in order to roll the edges of the coupling connector or the air ducts.

In accordance with one aspect of the present invention, the one portion of the gasket material increases in thickness toward the bead. This assists in providing a seal between the coupling connector and the air ducts and in addition snugs the joint by providing a tight fit between the coupling connector and the air ducts.

In accordance with another aspect of the present invention, the one portion has two seals extending therefrom on each side of the bead.

In accordance with another aspect of the present invention, the other portion of the gasket material that wraps around the first and second edges of the band forms gasket material edges that are beveled. The beveled edges of the gasket material ease the insertion of the coupling connector into air ducts or the insertion of the air ducts into the coupling connector.

In accordance with another aspect of the present invention, the band first and second edges have diameters that are equal. Such a coupling connector would be used to couple two air ducts of equal diameter. However, the coupling connectors can be used on air ducts of unequal diameter, wherein the band would be an expander or reducer.

In accordance with another aspect of the present invention, the gasket material comprises first and second gaskets, with the first gasket being wrapped around the first edge of the band and the second gasket being wrapped around the second edge of the band. Each of the first and second gaskets have a respective bead.

In accordance with another aspect of the present invention, the bead of the first gasket abuts against the bead of the second gasket.

In accordance with still another aspect of the present invention, each of the first and second gaskets have the one portion, with the one portions increasing in thickness toward the respective beads.

In accordance with another aspect of the present invention, each of the first and second gaskets have the one portion, with the one portions having two seals extending therefrom.

In accordance with another aspect of the present invention, the first and second gaskets each have an edge where the gasket material wraps around the respective first or second edge of the band, the edges of the first and second gaskets being beveled.

In accordance with another aspect of the present invention, an air duct installation is provided. The installation comprises first and second air ducts, each having an end. A band has first and second edges and an inside surface and an outside surface. The inside and outside surfaces extend between the first and second edges. The first air duct and the first edge of the band are in telescoping relation to one another. The second air duct and the second edge of the band are also in telescoping relation to one another. The ends of the first and second air ducts are adjacent to each other. A first gasket is interposed between the first air duct and the band and wraps around the first edge. A second gasket is interposed between the second air duct and the band and wraps around the second edge. The first and second gaskets each have seals in contact with the respective first and second air ducts. At least one bead is connected to one of the first and second gaskets and is interposed between the ends of the first and second air ducts.

In accordance with another aspect of the present invention, the first and second gaskets of the installation each have a thickness. The respective thicknesses increase toward the bead.

The present invention also provides a coupling connector for joining and sealing air ducts. The coupling connector comprises a band having first and second edges and having an inside surface and an outside surface. The inside and outside surfaces extend between the first and second edges. There is also a first gasket and a second gasket. Each of the first and second gaskets have a first portion in contact with one of the inside or outside surfaces of the band. The first portion of each of the first and second gaskets have a stop bead and a seal that extends radially away from the band. The first and second gaskets each have a second portion that is in contact with the other of the inside or outside surfaces of the band. The first and second portions of the first gasket are connected around the band first edge by a first connecting portion and the first and second portions of the second gasket are connected around the band second edge by a second connecting portion.

In accordance with another aspect of the present invention of the coupling connector, the first portion of each of the first and second gaskets decrease in thickness from the bead.

In accordance with another aspect of the coupling connector invention, each of the first and second connecting portions have beveled edges facing away from the band.

DESCRIPTION OF THE PREFERRED EMBODIMENT

Figure 1:
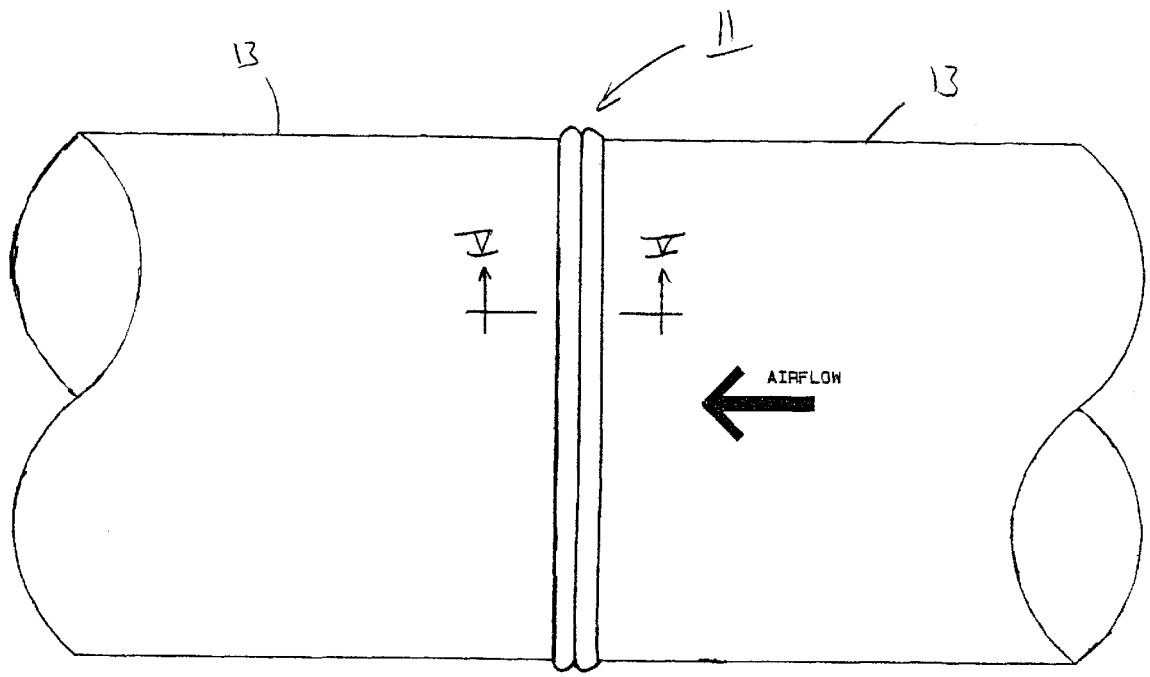
FIG. 1 is a schematic elevational view of an air duct joint, coupled together by the coupling connector of the present invention, in accordance with a preferred embodiment.
Figure 2:
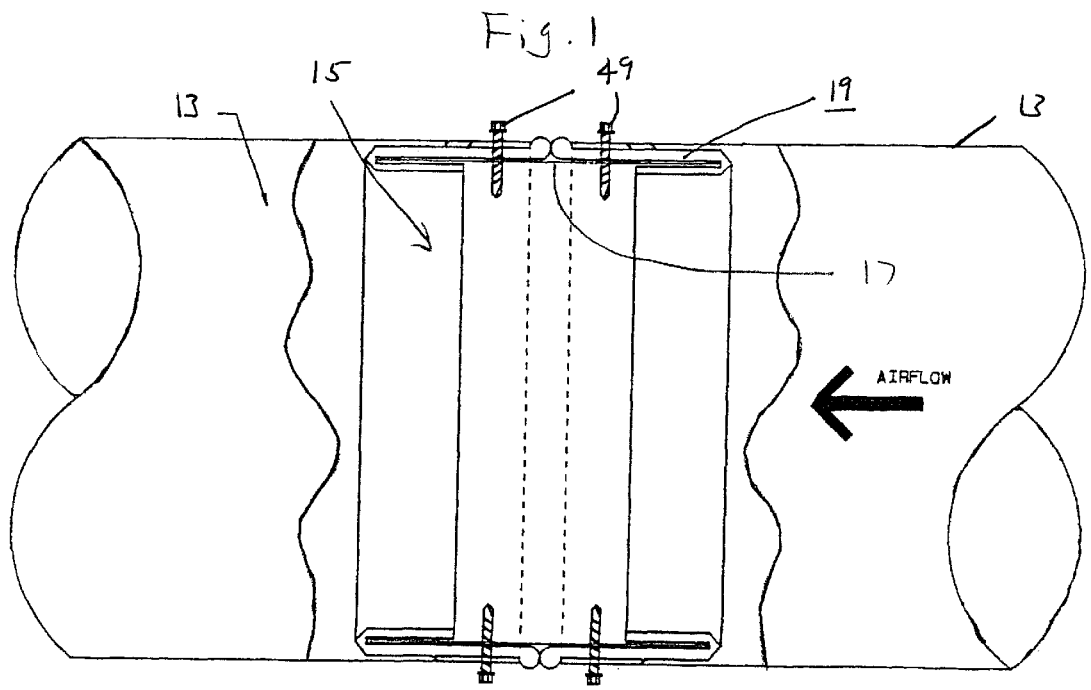
FIG. 2 is a schematic elevational view of the joint of FIG. 1, shown partially broken away and in cross-section.

In FIGS. 1 and 2, there are shown schematic elevational views of an air duct joint 11. The joint 11 includes first and second air ducts 13. The air ducts, which are conventional and commercially available, are made of sheet metal, and are typically cylindrical in transverse cross-section, although the ducts could be rectangular or some other shape in cross-section. The ducts could be made of other materials, such as fiberglass, coated metal or PVC plastic.

The two ducts 13 are joined together by a coupling connector 15. The coupling connector 15 has a band 17 and two gaskets 19 thereon.

Figure 5:
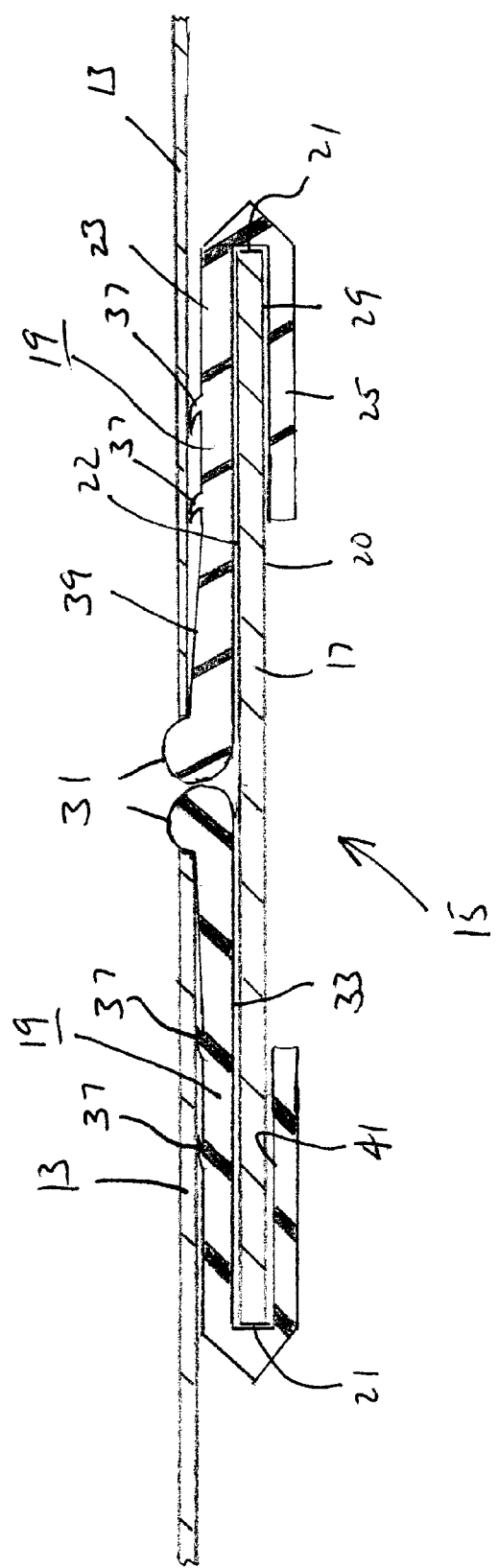
FIG. 5 is a schematic cross-sectional view of a portion of the joint, taken along lines V—V of FIG. 1.
Figure 6:
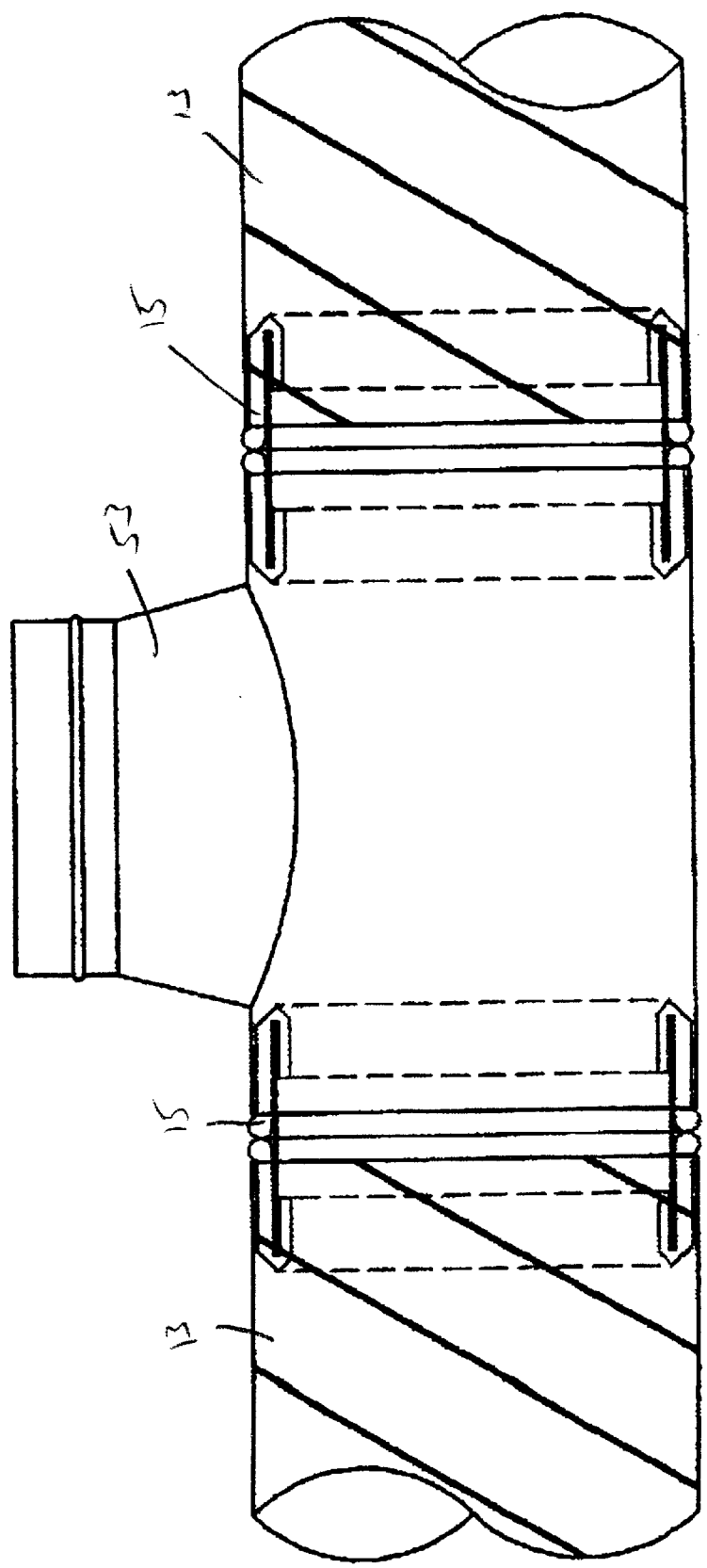
FIG. 6 is a schematic plan view showing a T-fitting air duct, joined to other ducts with the coupling connector.

The band 17 can be made of the same materials as the ducts, such as sheet metal. The band 17 is rigid when in normal use. The band can be fabricated the same way as the air ducts. In the preferred embodiment, where the coupling connector 15 is a male fitting, the outside diameter of the gasket 19 is less than the inside diameter of the air ducts 13. How much less depends on the thickness of the gaskets 19. The band 17 has two edges 21 as shown in FIG. 5. In addition, the band has an inside surface 20 and an outside surface 22.

Figure 3:
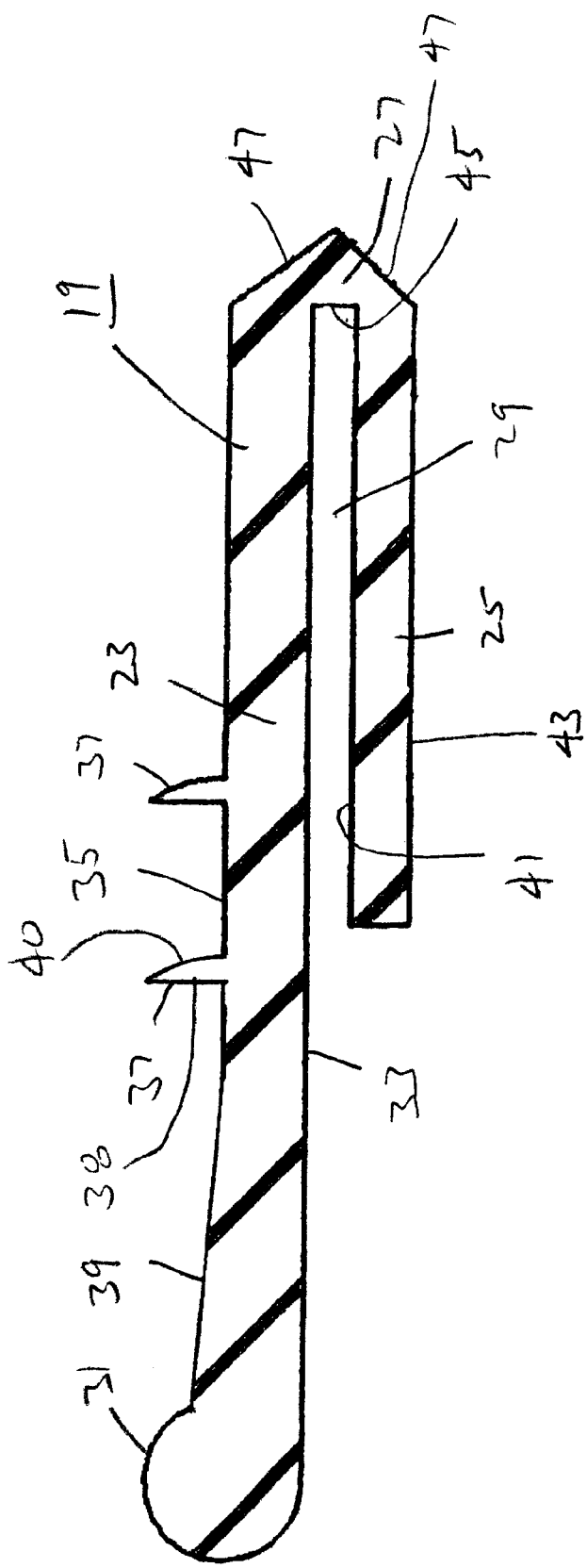
FIG. 3 is a cross-sectional detail view of the gasket.

Each band 17 has two gaskets 19, one on each edge 21. Referring to FIG. 3, each gasket 19 has a first portion 23, a second portion 25 and a coupling portion 27. The first and second portions 23, 25 are generally parallel to each other and are separated from each other by a gap 29. The coupling portion 27 couples the first and second portions 23, 25 together. The first, second and coupling portions 23, 25, 27 are all integral.

The strap like first portion 23 is interposed between the band 17 and an air duct 13 when the joint is assembled (see FIG. 5, note is not drawn to scale.) The coupling portion 27 is coupled to one edge of the first portion 23. The other edge of the first portion 23 has a bead 31. The first portion 23 has a smooth inside surface 33 that contacts the band 17. The first portion 23 also has an outside surface 35 that faces the air duct when the joint is assembled. The bead 31 extends out from the outside surface 35. Two lips 37 or flanges extend out from the outside surface 35. The lips 37 are separated from each other by a short distance. The lips 37 can be straight and extend radially out or the lips can be slanted toward the bead. Each lip can have straight surfaces or one or more radiused surfaces. In the preferred embodiment, each lip has a straight surface 38 and a radiused surface 40. The outside surface 35 is parallel to the inside surface 33 from the coupling portion 27 to just beyond the lips 37, wherein the outside surface is inclined 39 to the bead 31. The inclination 39 is such that the first portion 23 becomes thicker from the lips to the bead. This inclination 39 or thickening of the first portion assists in snugging the joint.

The second portion 25 has smooth parallel inside and outside surfaces 41, 43. The gap 29 between the first and second portions 23, 25 is sized to receive the band 17. The two gasket inside surfaces 33, 41 can be inclined relative to each other so as to provide a snug fit of the gasket onto the band. The second portion 25 need not have the same width, as measured between edges, as the first portion 23. (The length of the gasket being the circumference of the gasket around the band.) As shown in FIG. 3, the width of the second portion 25 is slightly greater than one half of the width of the first portion. The thicknesses of the first and second coupling portions 23, 25 need not be equal to each other.

The coupling portion 27, as discussed previously, couples the first and second portions 23, 25 together. The coupling portion 27 has an inside surface 45 that is adjacent to, or abuts against, the edge 21 of the band 17. The outside surfaces are inclined relative to the inside surfaces of the first and second portions, so as to form beveled edges 47 on the gasket. The beveled edges 47 ease the installation of the air duct onto the gasket.

The gaskets 19 are made of an elastomeric material. In the preferred embodiment, the gaskets 19 are made of ethylene-propylenediene-monomer (EPDM) rubber, with a 70 durometer. The gaskets are extruded and are cut to length to the desired circumference so as to fit around the band 17. The thicknesses of the portions 23, 25, 27 can be adjusted to use more or less material and provide the desired mechanical characteristics. In the preferred embodiment, the thicknesses are between 0.09–0.13 inches.

The coupling connector 15 is made as follows. After the band 17 is formed, the gaskets 19 are applied to the band edges. A gasket 19 is fitted around each edge 21 such that the gap 29 between the first and second portions 23, 25 receives the edge 21. A tacky substance can be sprayed into the gap 29 so as to better retain the gasket on the band. The gasket encircles the entire circumference of the band. The ends 51 (see FIG. 4) of the gasket are located as close as possible to each other to form a circle. Rubber caulk is used to seal between the two ends 51 of the gasket 19 so as to form a continuous seal around the circumference of the band 17. The other edge 21 of the band 17 is similarly fitted with a gasket. When the coupling connector 15 is complete, the bead 31 of one gasket contacts the bead of the other gasket. Thus, the width of the band is sized accordingly. The diameter of the outside surfaces 35 of the gaskets 19 are slightly smaller than the inside diameter of the ducts 13. The outside diameter of the lips 37 is slightly greater than the inside diameter of the ducts 13. The diameter of the inclination 29, at the bead, is substantially the same as or slightly less than the inside diameter of the ducts 13. The coupling connector 15 (shown in FIG. 4) is now ready for use.

The band 17 can be wider so that the two beads 31 are separated from one another by some distance. However, this could make sizing the length of the air ducts 13 more difficult during installation.

The band 17 need not be of one diameter. Instead, the band can be an expander/reducer, where one end has a bigger diameter than the other end. Each end has a gasket thereon. A coupling connector that uses such a band can be used to connect two different sizes of air ducts together.

Figure 4:
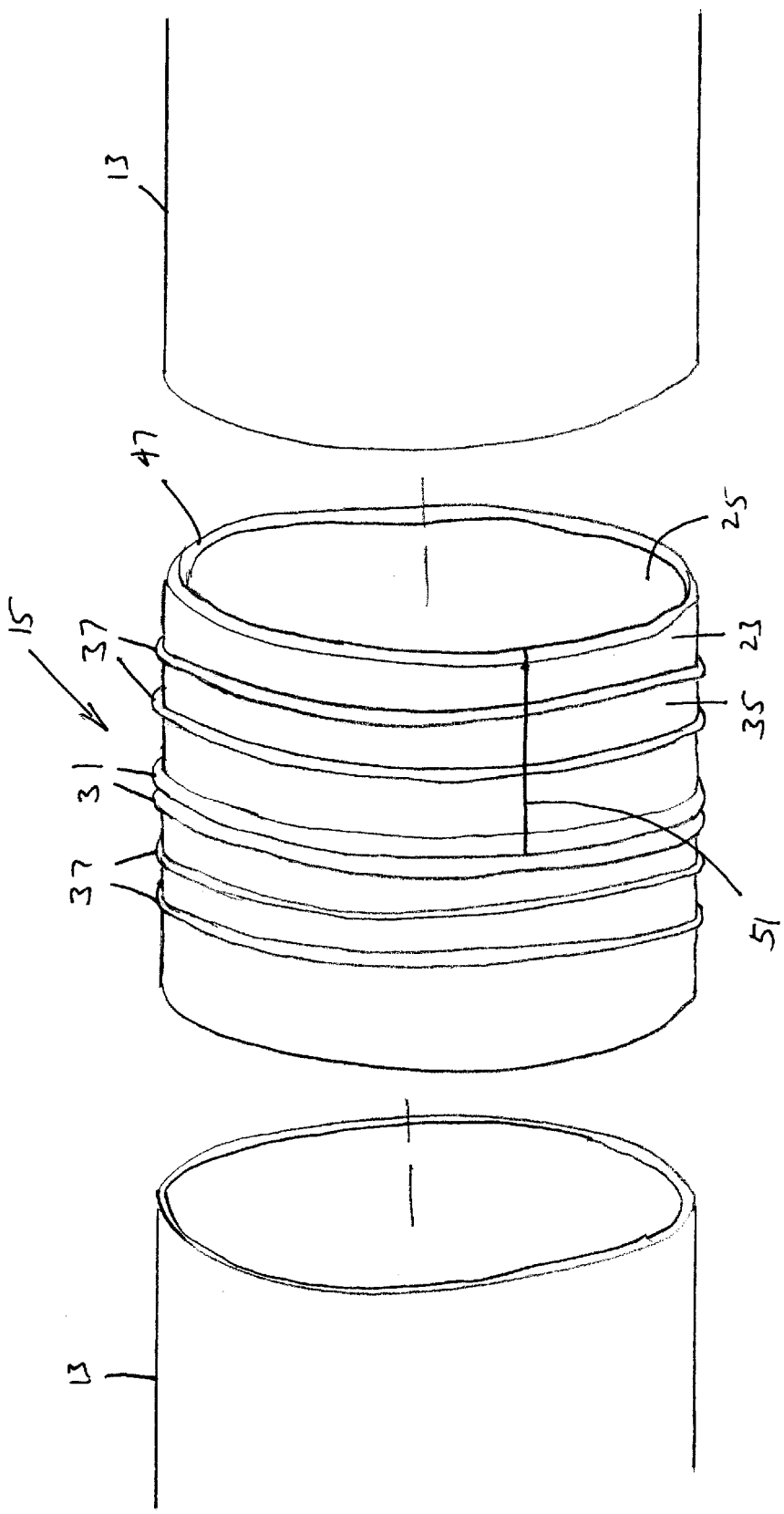
FIG. 4 is an exploded isometric view of the joint of FIG. 1.

To make a joint 11, the two air ducts 13 are positioned with the respective ends coaxial to each other (see FIG. 4). The coupling connector 15 is inserted into one of the ends. The beveled edges 47 assist in aligning the coupling connector with the air duct end. The air duct 13 fits around the outside circumference of (or telescopes onto) the respective gasket. The coupling connector is pushed into the air duct until the edge of the air duct abuts the respective bead 31 as shown in FIG. 5. Then, the other air duct is pushed onto the other end of the coupling connector 15 until the edge of that duct abuts the respective bead. The beads 31 provide both a visual and a mechanical stop so that the installer knows when the air ducts are fully positioned onto the coupling connector 15.

The coupling connector 15 provides an air tight fit. However, in order to secure the joint even further, sheet metal screws 49 (see FIG. 2) are driven through the air ducts. The screws 49 penetrate the air ducts 13, the first portion 23 of the gasket 19 and the band 17. The screws protrude into the interior of the air ducts. (In FIG. 2, the screws are shown as not being screwed all the way in. In actual practice, the heads of the screws should contact the outside surface of the ducts.) The joint 11 is now complete. The application of duct tape or mastic is not required.

The joint 11 both mechanically couples the two air ducts 13 together and provides an air tight seal between the band 17 and the air ducts 13. The band 17 provides the structural rigidity to mechanically couple the air ducts, while the gaskets provide the seals between the band and the ducts. Referring to FIG. 5, the band 17 is sealed by the inside surfaces 33, 41 of the first and second portions 23, 25 of the gaskets 19. The lips 37 provide a seal between the respective gasket 19 and the duct 13. The lips 37 are flexible and therefore bend toward the bead 31 as the air duct 13 is slid onto the coupling connector. The lips provide a circumferential seal against the duct surface. In addition, the inclined portion 39 of the outside surface provides a snug fit to make a good seal and tightens up the joint so as to minimize wobbling. The holes made by the screws 49 are sealed by the gaskets.

The joint of the present invention can be assembled quickly and easily, and without special tools, thus minimizing the cost of installation. In addition, the coupling connector is relatively inexpensive to manufacture.

Cut sheet metal has sharp edges. The edges can be rolled to blunt the sharp edges, but this adds to the expense of manufacturing. The gaskets 19 cover the edges of the band 17, thus reducing the chance of injury.

The finished joint provides an aesthetic look that minimizes the visibility of the coupling connector.

Furthermore, the placement of the screws 49 is not critical with the coupling connector as it is in other sealing arrangements. During installation, accurately placing the screws the desired distance from the edge of the duct is difficult. In sealing arrangements relying solely on lip seals, a screw through a lip can compromise the seal. With the present invention, the seal is distributed between the lips 37 and the inclination 39. Thus a screw that is improperly placed will not cause leakage.

Although the coupling connector 15 has been described as requiring two gaskets 19, a single integral gasket could be made to fit around both edges of the band. With such a gasket, only a single central bead would be needed. Installation of the gasket onto the band would be more difficult. The widths of the second portions can be adjusted in order to ease installation of such a gasket onto the band.

Although the coupling connector 15 has been described as a male fitting, it could be a female fitting or collar. The first portions 23 of the gaskets would be located inside of the band 17. The ends of the air ducts would be inserted into the coupling connectors until fully sealed against the beads. The advantage of using the coupling connector as an external collar type of fitting is that the air resistance caused by the joint is minimized. This is because the air flowing through the ducts contacts only the beads 31 and not the remainder of the coupling connector 15. However, with the male coupling connector shown in the figures, the connector is very thin and provides only minimal resistance to air flow inside of the air ducts.

What is claimed is:

1. A coupling connector for joining and sealing air ducts, comprising:

a) a band having first and second edges and having an inside surface and an outside surface, the inside and outside surfaces extending between the first and second edges;

b) gasket material having one portion in contact with either the inside surface or the outside surface of the band, the one portion having a stop bead and seals that extend radially away from the band, the stop bead being between the seals;

c) the gasket material having another portion that wraps around the first and second edges of the band;

d) the gasket material comprising first and second gaskets, with the first gasket being wrapped around the first edge of the band and the second gasket being wrapped around the second edge of the band, with each of the first and second gaskets having a respective bead;

e) the bead of the first gasket abuts against the bead of the second gasket.

2. An air duct installation, comprising:

a) first and second air ducts, each having an end;

b) a band having first and second edges and having an inside surface and an outside surface, the inside and outside surfaces extending between the first and second edges;

c) the first air duct and the first edge of the band being in telescoping relation to each other, the second air duct and the second edge of the band being in telescoping relation to one another, wherein the edges of the first and second air ducts are adjacent to each other;

d) a first gasket being interposed between the first air duct and the band and wrapping around the first edge, a second gasket being interposed between the second air duct and the band and wrapping around the second edge;

e) the first and second gaskets each having seals in contact with the respective first and second air ducts;

f) at least one bead connected to one of the first and second gaskets and being interposed between the ends of the first and second air ducts.

3. The installation of claim 2 wherein the first and second gaskets each have a thickness, the respective thicknesses increasing toward the bead.

* * * * *